(12) United States Patent
Burch et al.

(10) Patent No.: US 7,316,027 B2
(45) Date of Patent: Jan. 1, 2008

(54) TECHNIQUES FOR DYNAMICALLY ESTABLISHING AND MANAGING TRUST RELATIONSHIPS

(75) Inventors: Lloyd Leon Burch, Payson, UT (US); Douglas G. Earl, Orem, UT (US); Stephen R Carter, Spanish Fork, UT (US)

(73) Assignee: Novell, Inc., Provo, UT (US)

( * ) Notice: Subject to any disclaimer, the term of this patent is extended or adjusted under 35 U.S.C. 154(b) by 797 days.

(21) Appl. No.: 10/770,677

(22) Filed: Feb. 3, 2004

(65) Prior Publication Data

US 2005/0172116 A1    Aug. 4, 2005

(51) Int. Cl.
 *H04L 9/00* (2006.01)
(52) U.S. Cl. .................. 726/1; 726/2; 726/4; 726/27; 726/28; 713/155; 713/164; 713/166; 713/175; 709/223; 709/225; 709/228
(58) Field of Classification Search ............... 713/168, 713/175, 155, 164, 166; 380/277, 282; 726/1, 2, 4, 27, 28; 709/223, 225, 228
See application file for complete search history.

(56) References Cited

U.S. PATENT DOCUMENTS

| | | |
|---|---|---|
| 5,544,322 A | 8/1996 | Cheng et al. |
| 5,560,008 A | 9/1996 | Johnson et al. ............. 395/650 |
| 5,706,427 A | 1/1998 | Tabuki ........................ 713/201 |
| 5,737,523 A | 4/1998 | Callaghan et al. .......... 713/201 |
| 5,787,175 A | 7/1998 | Carter ........................ 713/165 |
| 5,818,936 A | 10/1998 | Mashayekhi ................. 380/25 |
| 5,841,970 A | 11/1998 | Tabuki .................. 395/187.01 |
| 5,848,232 A | 12/1998 | Lermuzeaux et al. ....... 713/201 |
| 5,913,025 A | 6/1999 | Higley et al. .......... 395/187.01 |
| 5,999,711 A | 12/1999 | Misra et al. ........... 395/187.01 |
| 6,014,135 A | 1/2000 | Fernandes .................... 345/744 |
| 6,088,451 A | 7/2000 | He et al. |
| 6,092,199 A | 7/2000 | Dutcher et al. ............. 713/201 |
| 6,108,788 A | 8/2000 | Moses et al. ................ 713/201 |
| 6,119,230 A | 9/2000 | Carter ........................ 713/200 |

(Continued)

FOREIGN PATENT DOCUMENTS

EP    0547741 A1    6/1993

(Continued)

OTHER PUBLICATIONS

Schneier, Bruce; Applied Cryptography, second edetion, 1995, pp. 185-187.*

(Continued)

*Primary Examiner*—Kim Vu
*Assistant Examiner*—Beemnet W Dada
(74) *Attorney, Agent, or Firm*—Schwegman, Lundberg & Woessner, P.A.

(57) ABSTRACT

Techniques are provided for dynamically establishing and managing trust relationships. A first principal initially requests a community list. The community list includes identities of one or more second principals with which the first principal can establish trusted relationships with. The community list is associated with a trust specification. The trust specification defines the policies and access rights associated with interactions between the first principal and the second principals during any active trusted relationships. The first principal can dynamically subdivide, manage, and modify entries of the community list and the trust specification, assuming any such modifications are permissible according to global contracts and policies associated with the first principal.

24 Claims, 3 Drawing Sheets

U.S. PATENT DOCUMENTS

| | | | |
|---|---|---|---|
| 6,230,271 B1 | 5/2001 | Wadlow et al. | 713/201 |
| 6,263,446 B1 | 7/2001 | Kausik et al. | 713/201 |
| 6,343,361 B1 | 1/2002 | Nendell et al. | 713/171 |
| 6,430,575 B1 | 8/2002 | Dourish et al. | 707/200 |
| 6,515,316 B1 | 2/2003 | Wojtowicz et al. | 713/201 |
| 6,539,482 B1 | 3/2003 | Blanco et al. | 713/201 |
| 6,718,470 B1 | 4/2004 | Adams | |
| 6,870,842 B1* | 3/2005 | Caronni et al. | 370/390 |
| 6,957,261 B2 | 10/2005 | Lortz | |
| 7,035,828 B2* | 4/2006 | Ketonen et al. | 705/51 |
| 7,140,044 B2* | 11/2006 | Redlich et al. | 726/27 |
| 2001/0034841 A1 | 10/2001 | Shambroom | |
| 2002/0184310 A1* | 12/2002 | Traversat et al. | 709/204 |
| 2003/0002521 A1 | 1/2003 | Traversat et al. | |
| 2003/0023880 A1 | 1/2003 | Edwards et al. | 713/201 |
| 2003/0061144 A1 | 3/2003 | Brickell et al. | |
| 2003/0070070 A1* | 4/2003 | Yeager et al. | 713/157 |
| 2003/0097449 A1* | 5/2003 | Derocher et al. | 709/227 |
| 2003/0235309 A1* | 12/2003 | Struik et al. | 380/278 |
| 2004/0128378 A1 | 7/2004 | Blakley, III et al. | |
| 2004/0187031 A1* | 9/2004 | Liddle | 713/201 |
| 2004/0210771 A1 | 10/2004 | Wood et al. | |
| 2004/0221043 A1* | 11/2004 | Su et al. | 709/227 |
| 2005/0120199 A1 | 6/2005 | Carter | |
| 2006/0277595 A1 | 12/2006 | Kinser et al. | |

FOREIGN PATENT DOCUMENTS

WO    WO-0079432 A1    12/2000

OTHER PUBLICATIONS

Aarts, Robert, et al., "Liberty ID-FF Bindings and Profiles Specification", *Liberty Alliance Project, Version 1.2*, (2003),1-61.

Aarts, Robert, et al., "Liberty ID-FF Protocols and Schema Specification", *Liberty Alliance Project, Version 1.2*, (2003),1-46.

Madsen, Paul, et al., "Liberty Metadata Description and Discovery Specification", *Liberty Alliance Project, Version 1.0*, (2003),1-33.

"U.S. Appl. No. 10/765,523, Response filed Jul. 6, 2007 to Non-Final Office Action mailed May 17, 2007", 7 pgs.

"U.S. Appl. No. 10/765,523, Non-Final Office Action mailed May 17, 2007", 14 pgs.

Goodwin, R, et al., "Instance-Level access control for Business to-Business Electronic Commerce", *PowerPoint Presentation*, Presented By Vandana Janeja,(2001),1-48.

Rowley, Andrew, "A Security Architecture for Distributed Groupware", *Department of Computer Science, University of London*, (Sep. 1998),142 pgs.

Sun Microsystems, Inc., "Java? 2 Platform Enterprise Edition Specification, v1.4", *Sun Microsystems, Inc. User Manual*, Final Release,(Nov. 24, 2003),1-246.

* cited by examiner

US 7,316,027 B2

TECHNIQUES FOR DYNAMICALLY ESTABLISHING AND MANAGING TRUST RELATIONSHIPS

RELATED APPLICATIONS

The present invention is related to co-pending and commonly assigned U.S. application Ser. No. 10/765,523 filed on Jan. 27, 2004, entitled: "Techniques for Dynamically Establishing and Managing Authentication and Trust Relationships," the disclosure of which is incorporated by reference herein.

FIELD OF THE INVENTION

The invention relates generally to network security, and more specifically to techniques for dynamically establishing and managing trust relationships.

BACKGROUND OF THE INVENTION

Individuals are increasingly engaging in electronic communications with other individuals, electronic services, and resources over the Internet. In many cases, these communications need to be secured and trusted, such that the parties can assure one another as to the true identity of the participants engaging in the communications. This is so, because the communications that occur during these transactions can unwittingly expose confidential data about the participants. However, there is a tradeoff between improving security and flexibility/management, such that security is adequate enough but any technique used is not too rigid, too cumbersome, and too difficult to establish and manage.

One conventional technique that permits a trusted relationship between two or more parties is to maintain and manage a separate trusted data store in each of the local processing environments of the parties. Each trusted data store includes identifiers for the remaining parties and includes a unique public key certificate for each of the remaining parties. The public key certificates are used to encrypt communications directed to the remaining parties, when the communications are occurring over non-secure communication lines or with non-secure protocols. The problem with this approach is that it is too difficult to manage and too cumbersome, because several disparate trusted data stores must be kept in synchronization with one another and because sometimes a particular party may use a different computing device or move an existing computing device (e.g., laptop, personal digital assistant, cell phone, etc.) from its typical network service provider (e.g., Internet Service Provider (ISP), or other Service Providers (SP)).

When a party becomes mobile, he/she divorces himself/herself from a particular processing device or SP environment. Correspondingly, a needed trusted data store may not be available to the party and/or a private key associated with a party's public-private key pair may not be available for that party to access. Thus, this technique does not provide a continuously and reliable level of service to the parties involved.

Another technique is to establish dedicated and secured transmission lines between trusted parties. With this technique, the parties are physically tied to their existing processing devices and SP environments, since any deviation will not make the secure transmissions lines available for pre-defined and trusted relationships. This technique may offer the highest degree of security, but it is also the most rigid, the most inflexible, and much too costly for the vast majority of individuals that access the Internet on a casual or personal basis.

Still other techniques are geared towards commercial SPs, in these arrangements SPs pay to have a static and strongly rooted public key administered from a third-party service (e.g., Verisign), any needed public key for a particular participating SP can be acquired from the third-party. The problem with this technique is that a typical end-user or small entity may not be able to afford the services of the third-party. Furthermore, any participating SP is still rigidly tied to a static public key. This means that should an Internet Protocol (IP) address for a participating SP change, then the third-party may need to be synchronized with a new public key. Moreover, this is useful only when all parties to the relationship are subscribers to the third-party service, since all parties in a trusted relationship need to communicate their respective and valid public keys to the remaining parties. Thus, these techniques are still too costly, too rigid, and designed to assist and benefit only SPs, not a causal Internet end-user.

Thus, improved techniques for dynamically establishing and managing trust relationships are needed.

SUMMARY OF THE INVENTION

In various embodiments of the invention, techniques are presented for dynamically establishing and managing trust relationships. Principals can request community lists from a trusted identity service. The community lists identify permissible other principals with whom a particular requesting principal can establish and manage trust relationships.

The community list is also associated with a trust specification that identifies policies and access rights initially defined for the principals included within the community list. A requesting principal can subdivide the community list into sets of particular principals and modify its version of the trust specification to include more limiting policies or access rights for the sets of particular principals. In this way, a requesting principal can dynamically establish overlay networks from his/her community list having policies and access rights desired by the requesting principal.

DETAILED DESCRIPTION OF THE INVENTION

Figure 1:
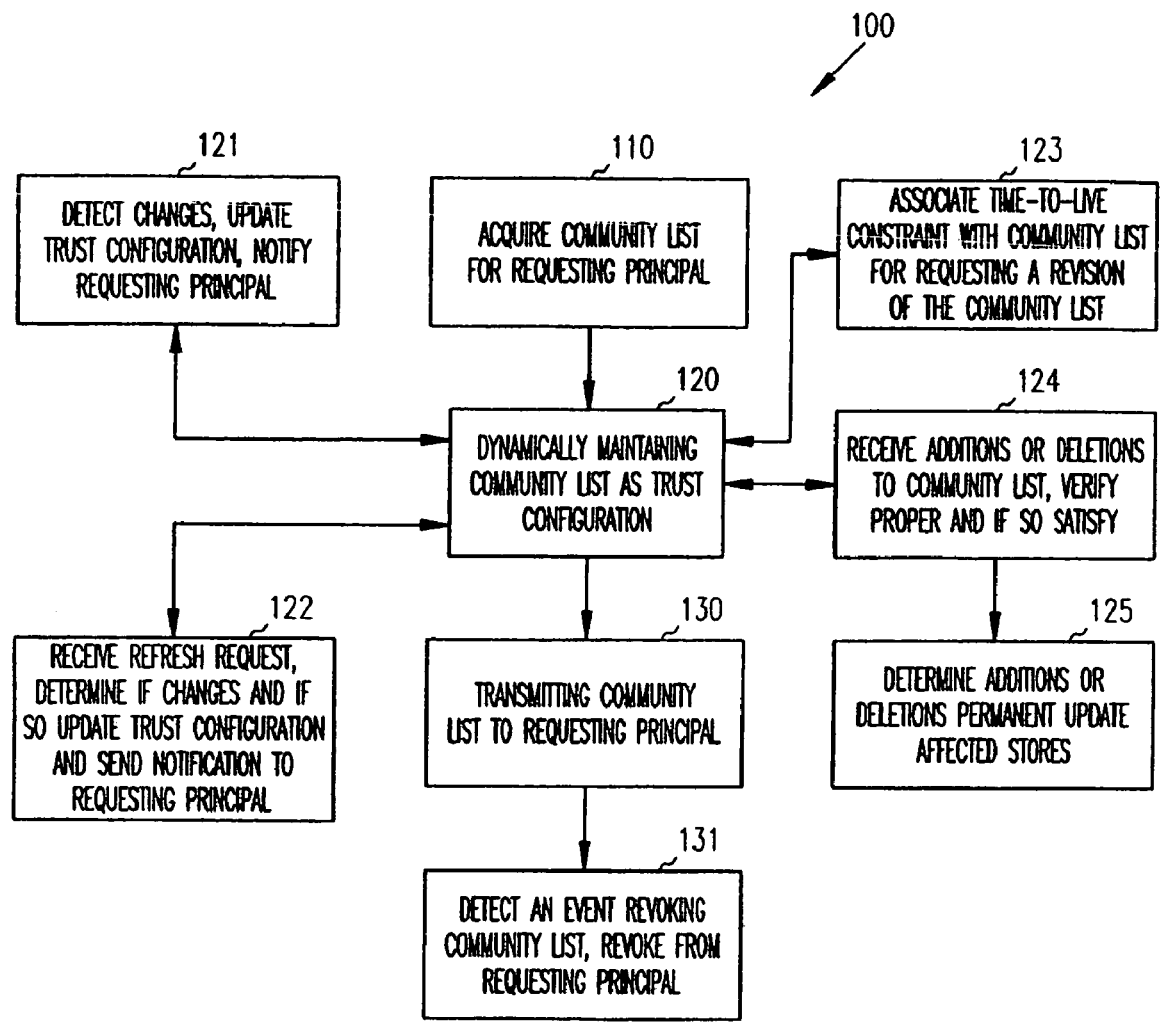
FIG. 1 is a flowchart representing a method for dynamically establishing trusted relationships.

In various embodiments of the invention, the term "principal" is used. A principal is an electronic representation of an entity. An entity can be a resource, a user, an agent, an application, a system, a service, a group, a department, an object, etc. An entity consumes information, provides information, provides a service to other entities over a network, or performs any combination of these operations.

In one embodiment, the term principal is consistent with how that term is generally understood in the security arts. For example, the term principal can be used in the context of Security Assertion Markup Language (SAML) which is an extension of the Extensible Markup Language (XML). SAML is used for securely processing assertions about a user or application (e.g., principal). More recently, SAML has been extended with technology referred to as Liberty. Liberty is part of the Liberty Alliance Project (LAP) and is attributed to open interoperable standards for federated network identities. Thus, the term principal can also be used in the context of Liberty technologies.

A SAML encoded statement includes an assertion, a protocol, and a binding. There are generally three types of assertions: an authentication assertion used to validate a principal's electronic identity, an attribute assertion that includes specific attributes about the principal, an authorization assertion that identifies what the principal is permitted to do (e.g., policies). The protocol defines how a SAML processing application will ask for and receive the assertions. The binding defines how SAML message exchanges are mapped to Simple Object Access Protocol (SOAP) exchanges, or other protocol exchanges.

In general terms, SAML techniques improve security between business-to-business (B2B) electronic transactions and business-to-customer (B2C) electronic transactions. The techniques permit one principal to log in with a single transaction to a receiving principal and then use a variety of the receiving principal's disparate services by providing the SAML statements when needed. SAML techniques are not limited to inter-organization relationships (e.g., B2B or B2C); the techniques can be used within a single organization (intra-organization). SAML techniques are supported with a variety of network protocols, such as Hypertext Transfer Protocol (HTTP), Simple Mail Transfer Protocol (SMTP), File Transfer Protocol (FTP), SOAP, BizTalk, and Electronic Business XML (ebXML). The Organization for the Advancement of Structured Information Standards (OASIS) is the standards group for SAML. The techniques of Liberty are enhancements to the SAML techniques and may also be used in connection with various embodiments of this invention.

However, it is to be understood that SAML and Liberty techniques are not needed to perform the teachings of all embodiments of the invention. These techniques complement some embodiments of this invention. In this sense, the integration of SAML and Liberty techniques with some of the embodiments presented herein is intended to be part of certain aspects of this invention, but not all embodiments of this invention are dependent on SAML or Liberty technology.

In a similar manner there are various other existing authentication techniques that may be practiced in connection with some embodiments of this invention. But, once again these other authentication techniques are not necessary for realizing the benefits of all embodiments of the invention. Some of these techniques include Public Key Infrastructure (PKI) techniques including public-private key pairs, digital certificates, biometric authentication, or use of conventional identifications and passwords.

As used herein and below a "community list" is a data structure associated with a particular principal. The entries of the community list include identifiers for other different principals which whom the particular principal may interact. Each identifier is also associated with metadata, the metadata includes indications as to whether a principal identified by a particular identifier must be in a trusted relationship, should be in a trusted relationship, may be in a trusted relationship, should not be in a trusted relationship, or must not be in a trusted relationship with the principal that is associated with a particular instance of the community list.

In some embodiments, the indications are not needed and in these embodiments, the community list includes principal identifiers which can or may be in trusted relationships with the principal associated with a particular instance of the community list. If there is ambiguity as to whether a particular principal identifier is permitted to be in a trusted relationship, then the metadata can assist a principal associated with a particular instance of the community list in resolving this ambiguity by providing the conditions or events that are needed to resolve that ambiguity. For example, a particular principal may not be permitted to be in a trusted relationship with a principal associated with a particular instance of the community list if that particular principal is being accessed at a certain time of day, accessed on a certain calendar day, accessed on a certain day of the week, accessed from a certain physical location, accessed from a certain type of processing device (e.g., laptop, phone, kiosk, personal digital assistant, etc.), and the like.

In some embodiments, the metadata also includes key information, such as a public key certificate of a particular principal. This may be useful, when a principal associated with the community list needs to communicate with a different principal identified in the community list via encrypted communication. The public key permits the communications to be encrypted with the public key certificate, which can only be decrypted by a principal having a corresponding private key associated with that public key.

The community list is also associated with a global trust specification that is produced by the identity service when the community list is generated for a requesting principal. The global trust specification includes the policies and access rights of the principals identified in the community list and identifies a limitation on what may or may not be done with interactions or relationships established with the various principals identified in the community list.

In one embodiment, the global trust specification is a separate data structure that is acquired independent of the community list from the identity service. In another embodiment, the community list includes a pointer to the trust specification, such that some portions of its metadata (e.g., that pointer) permit a requesting principal to acquire a copy of the global trust specification from the identity service. In still other embodiments, the global trust specification is part of the community list data structure.

A requesting principal can modify his/her version of the trust specification and subdivide it into a plurality of sub-trust specifications as needed. However, the requesting principal cannot exceed the hard limitations defined in the initial global trust specification. Moreover, a requesting principal can group the community list into sub-community lists and modify them by adding or removing principal identifiers. In some embodiments, when a new principal is added to the community list or sub-community list, the addition is requested via the identity service. In other instances, the original supplied community list will include the new principal that is being added and may require (via its metadata) that the requesting principal satisfy some initial conditions before any requested add operation can successfully process.

Various embodiments of this invention can be implemented in existing network products and services. For example, in some embodiments, the techniques presented herein are implemented in whole or in part in the iChain®, Border Manager®, and Excelerator® products distributed by Novell, Inc., of Provo, Utah.

Of course, the embodiments of the invention can be implemented in a variety of architectural platforms, systems, or applications. For example, portions of this invention can be implemented in whole or in part in any distributed architecture platform, operating systems, proxy services, or browser/client applications. Any particular architectural layout or implementation presented herein is provided for purposes of illustration and comprehension only and is not intended to limit the various aspects of the invention.

FIG. 1 is a flowchart representing one method 100 for dynamically establishing trust relationships. The method 100 is implemented as one or more applications or services which reside in a computer-accessible medium and is accessible over a network. In one embodiment, the method 100 is implemented as a service that interfaces with a client or principal service of an initially requesting principal. A client is a processing device that a principal is using to interact with the principal service. The principal service is an interface application that interacts with the processing logic of the method 100 (herein after "identity service"). The identity service need not be in operation (e.g., it can be embedded on one or more removable computer readable media (e.g., CD, DVD, diskette, memory stick, etc.) and distributed), but when the identity service is operational it performs the following techniques for dynamically establishing trust relationships for a requesting principal.

Initially, a requesting principal makes contact with the identity service and requests a community list. The requesting principal is in a trusted relationship where the requesting principal and the identity service have authenticated to one another when the contact is initially made or when the requesting principal authenticated with a known identity service. Alternatively, when the contact is made the identity service uses the appropriate policy to authenticate the requesting principal and establish a trusted relationship with the requesting principal. The remaining embodiments of the invention presupposes that the principals are in trusted relationships with the identity service, or will otherwise engage in interactions according to policies in order to properly authenticate to one another and establish trusted relationships with one another.

The community list identifies permissible or non-permissible trusted relationships that the requesting principal may or may not engage in. Additionally, that community list may include conditions associated with permitting particular principals to engage in trusted relationships with the requesting principal. That is, some principals identified in the community list are not automatically permitted to be in a trusted relationship with the requesting principal, but are permitted to be in such a relationship if certain conditions are satisfied.

In some embodiments, the requesting principal does not in fact make a request for the community list, rather the community list is pushed to the requesting principal based on some predefined condition or event detected by the identity service, or based on the request of an authorized different principal. Thus, a requesting principal can acquire the community list for management from a pull model (directly requested from the identity service) or from a push model (not requested but foisted on the requesting principal by the identity service).

When the identity service determines that a community list is needed for a requesting principal, the identity service acquires or assembles the needed community list at 110. One way to do this is to acquire a global contract or global policy associated with the requesting principal and determines firstly if the requesting principal is authorized to receive a community list. Secondly, if the requesting principal is authorized to receive the community list, the identity service inspects the global contract to determine where to acquire or how to assemble the community list. In some embodiments, a global contract defines specific trusted or identity stores associated with the requesting principal that contain the identities of needed principals and any conditions associated with those principals that would or would not permit a trusted relationship with the requesting principals.

In another embodiment, the identity service maintains a community list for the requesting principal in a locally accessible and secure data store. This community list is synchronized and managed by the identity service, such that when changes are detected in one or more of a requesting principal's trusted or identity stores, the community list is updated and vice-versa.

The acquired community list is made active in the memory and/or storage accessible to the identity service and dynamically maintained in a trust configuration associated with the requesting principal. The identity service is capable of simultaneously servicing, acquiring, and maintaining multiple instances of a community list for multiple different and unique requesting principals.

The identity service also configures a trust specification for the community list. As previously described, the trust specification can be part of the community list or a separate and distinct data structure from the community list. The trust specification includes the policies and access rights associated with the principals identified in the community list. This trust specification serves as a threshold limitation on the requesting principal, which means the hard limitations defined in the trust specification can not be expanded by the requesting principal when the requesting principal receives a copy of the trust specification. However, the requesting principal can add more restrictive limitations to its version or sub versions of the received trust specification.

At 130, the community list and the trust specification are transmitted to the requesting principal. The requesting principal may now directly manage its own relationships with the principals identified in the community list subject to the threshold limitations defined in the trust specification. This means the requesting principal can form its own overlay networks with the identified principals for purposes of establishing dynamic peer-to-peer networks. Each of these overlay networks can include policies and access rights defined or modified by the requesting principal, assuming policies and access rights do not exceed the initial threshold limitations of the initially generated trust specification.

It should also be noted that each principal identified in the community list can in fact be associated with a group, where that group includes multiple entries and each entry associated with a different principal. This relationship can be recursive, such that an entry of a group can in fact be another group. In a like manner, a principal identified in the community list can in fact be another community list. Again, this relationship can be recursive, such that an embedded community list can include other community lists.

During the dynamic management of the community list which was generated for the requesting principal at 120, a variety of events can optionally occur that may require interaction from the identity service. For example, at 121, the identity service may be configured to dynamically push detected changes occurring in the community list to the requesting principal. If this configuration is desired, the identity service at 121 will detect a change (the change may be initiated by a different principal other than the requesting principal), update its trust configuration and any maintained community list, and notify the requesting principal of the change.

In another embodiment, the requesting principal may issue a refresh request at 122. A refresh request informs the identity service that the requesting principal desires the identity service to check for and deliver an updated community list to the requesting principal. Accordingly, at 122, the identity service receives the refresh request, determines if changes have occurred, updates its trust configuration accordingly, and notifies the requesting principal of any changes that resulted from the refresh request.

In still another instance, at 123, the identity service may be configured to associate a time-to-live constraint when the community list is initially acquired and sent to the requesting principal. In this instance, the time-to-live constraint informs the requesting principal when it is desirable or mandated that a refresh request be issued. Thus, when the time-to-live constraint is satisfied, the requesting principal may elect to issue a refresh request or may be forced, based on its configuration, to issue a refresh request. When such a refresh request is issued, the identity service performs the processing identified at 122.

In many embodiments, the community list and the trust specification are freely manipulated and managed by the requesting principal. These changes need not be communicated to the identity service and in many instances, where they are permissible according to the originally issued trust specification; these changes may not be communicated to the identity service. However, in some situations, changes made by the requesting principal to the community list may be communicated to the identity service, such as when the requesting principal desires some changes to be made permanent or be made temporary for some configurable period of time (e.g., active session) or for some configurable period during which an event is not raised that may terminate the changes (e.g., requesting principal is using a different processing device, accessing the identity service from a different physical location, etc.).

Thus, in these latter situations, at 124, the identity service receives additions or deletion requests and any associated conditions or policies from a requesting principal which affects the community list and trust configuration being dynamically maintained by the identity service. If an add operation is received, the identity service inspects a contract or global policy associated with the requesting principal and determines if such an add operation is permissible, if it is, a new principal is added to the identity services trust configuration being maintained by the identity service. Conversely, if a delete operation is received, the identity service performs the same checks and if permitted performs a delete operation on a particular principal from the trust configuration being maintained by the identity service. In some cases, if desirable, and if the requesting principal's contract and global policy permit, the changes received from the requesting principal can be made permanent. In these cases, at 125, the identity service will contact and update the appropriate trust or identity stores associated with the requesting principal in order to effectuate the needed changes.

In another embodiment, the identity service can be configured to detect when a particular community list issued to a requesting principal is to be revoked based on some defined event (e.g., administrator determines the requesting principal is to have no access to or management of community lists). Here, at 131, the identity service detects the event and revokes the community list and its use from the requesting principal.

In some embodiments it may be that the identity service can acts as a trusted intermediate between the requesting principal and a third-party principal (e.g., Verisign), where that third-party principal houses a strongly rooted public-private key pair for the requesting principal. As an example illustration of this embodiment, consider that the requesting principal is accessing the identity service via a different processing device such that the requesting principal's strongly rooted public-private key pair is not available and the requesting principal desires to interacted in a trusted relationship with a second principal. The second principal may not be capable of interfacing with the identity service, but the third-party principal is in a trusted relationship with the identity service and the requesting principal is in a trusted relationship with the identity service as well.

In this example, the requesting principal desires to interact in a trusted relationship with the second principal, but the only way to achieve that is to acquire the strongly rooted public-private key pair. The requesting principal may have a well-known certificate from the third-party principal which it can use to authenticate with the third-party service, but because the requesting principal lacks the strongly rooted public-private key pair (specifically the private key) it will not be able to decrypt messages received from the third-party principal in order to make that information useful.

The requesting principal can use the teachings of this invention to acquire the strongly rooted public-private key pair in the following manner. The requesting principal authenticates and enters into a trusted relationship with the identity service and acquires its community list. The community list identifies the second principal; the requesting principal uses the dynamic public-private key pair created when the first principal authenticated with the identity service and uses the public key contained in the well-known certificate of the third-party principal to encrypt this certificate. The encrypted certificate is transmitted to the identity service; the identity service signs it and forwards it to the third-party principal. The third-party principal validates the identity service's signature as a trusted service, decrypts the initial encryption with the private key associated with the well-known certificate, and determines that the contents are a certificate that identifies the requesting principal whose trust is established because of the trust between the third-party principal and the identity service.

Next, the third-party principal, using information in the requesting principal's certificate, obtains the strongly rooted key pair associated with the requesting principal, encrypts this strongly rooted key pair with the public key of the requesting principal contained in the certificate, signs it with the third-party private key associated with the well-known certificate, and sends it to the identity service. The identity service cannot decrypt the data since the dynamically generated private key of the requesting principal is needed to do that, which has remained in the possession of the requesting principal. The data is then sent back to the requesting principal, where the requesting principal uses its dynamically generated private key to decrypt the data and acquire its strongly rooted key pair. Now, the requesting principal can freely interact in a trusted relationship directly with the third-party principal or with the second principal which may not be capable of interacting with the identity service but can utilize credentials created via the strongly-rooted key pair. This can happen because the requesting principal now has its strongly rooted public-private key pair. This all happened dynamically and through the use of the community list and the identity service.

The embodiments of FIG. 1 demonstrate how a community list can be acquired and dynamically managed. Portions of the management are delegated to a requesting principal that receives the community list, subject to threshold limitations defined in an initially issued trust configuration. The requesting principal can access, modify, divide, and manage the community list and the trust specification in order to dynamically create and interact with one or more principals or sets of principals in manners desired by the requesting principal.

Figure 2:
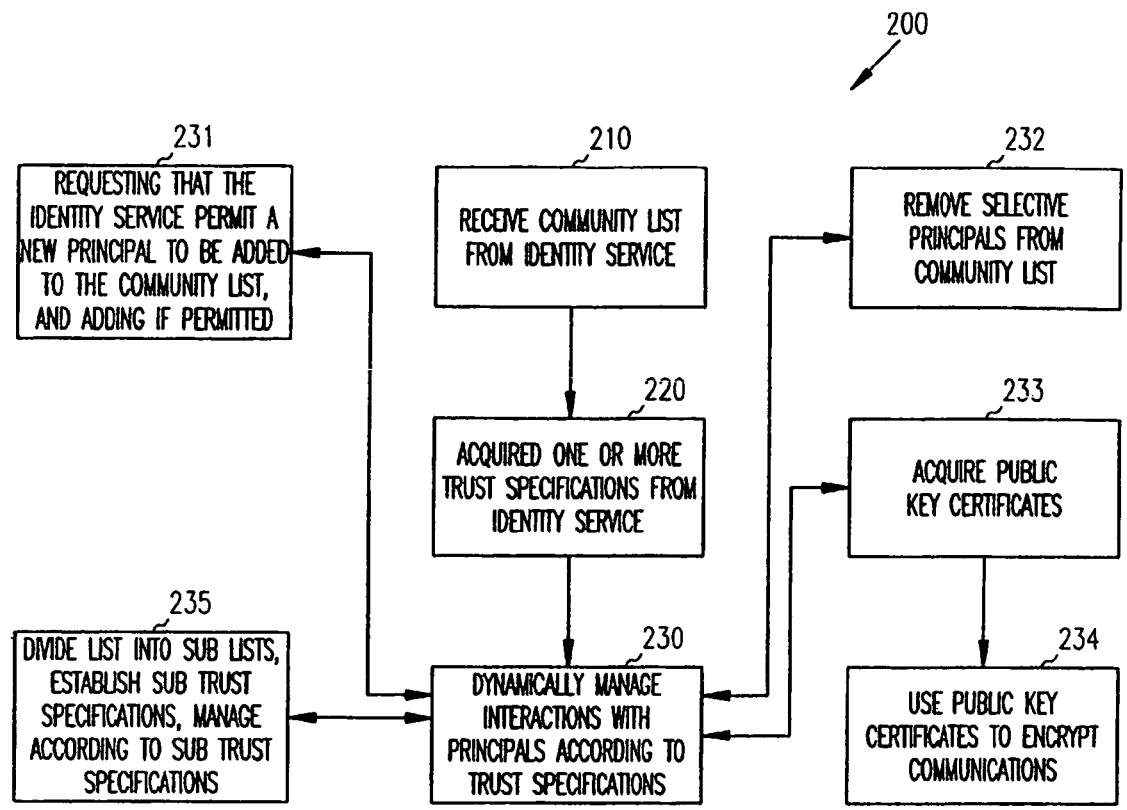
FIG. 2 is a flowchart representing a method for dynamically managing trusted relationships.

FIG. 2 is a flowchart of one method 200 for dynamically managing trust relationships. The processing of the method 200 is implemented in a principal service accessible to and processed by a principal for purposes of acquiring and managing a community list. Method 100 describes the processing associated with an identity service, conversely method 200 describes the processing that a requesting principal uses via a principal service to interact with the identity service of FIG. 1 and to dynamically manage trust relationships by evaluating and manipulating a community list and a trust specification associated therewith.

At 210, the principal service receives a community list from an identity service. The community list includes one or more principals with which trusted relationships can be established. In some cases, the community list identifies some principals that are not permissible to be in a trust relationship with a particular principal, who is associated with and interfacing with the principal service. In some cases, the community list identifies some principals that require the satisfaction of certain conditions or events before these principals can be in trusted relationships with a particular principal associated with the principal service.

At 220, one or more trust specifications are acquired from the identity service. The trust specifications define the policies and access rights associated with particular principals identified in the community list. Moreover, the trust specifications include limitations or threshold policies and access rights which may not be exceeded by the principal service. However, the principal service manages copies of the trust specification in its local computing environment and is free to subdivide the trust specifications and add more limiting policies and/or access rights to the trust specifications.

At 230, the principal service dynamically manages interactions with the principals identified in the community list according to the trust specifications. In some cases, the principal service may request that a new principal be added to the community list, in these instances the identity of the new principal may already be pre-existing in the community list but require that certain preconditions be met by the principal service before the new principal can be officially in a position to enter into a trusted relationship with a particular principal that is interfacing with the principal service. In other cases, at 231, the principal service contacts the identity service and request that the new principal be permissibly added to the community list. The identity service inspects the appropriate contract and global policy of the principal associated with the principal service and determines whether the new principal can be added to the community list. If conditions are met and permissible, then the identity service adds the new principal to the community list and informs the principal service that the add operation was successful.

In another embodiment, at 232, the principal service may elect to remove selective principals from its locally managed community lists. In these situations, assuming the trust specification does not prohibit any such removal request, the principal service removes the selective principals from its community lists. In one embodiment, the principal service may request that the selective removal occur within the community list being managed by the identity service or may request that the removal occur on a permanent or semi-permanent basis. Assuming a contract or global policy permits the principal service to request such a change, the change will occur and be processed by the identity service.

In other embodiments, principals can be logically represented as objects having attributes and methods associated with that object. The objects are natively stored and remain persistent in identity stores. When community lists are created having principals, the embedded principals are represented as derived instances of the parent principal object, which is natively housed in the data store. Attributes of the derived instance can include methods to synchronize changes occurring in the derived instances and the parent principal object automatically. Alternatively, other methods can be set to intentionally not synchronize the derived instances with the parent. Private methods associated with attributes can issue calls to the appropriate locations in the data store to find and make changes, conversely changes made in the data store can be sent via pointers to the corresponding locations in the derived instances. Methods associated with attributes could be configured to periodically synchronize or synchronize upon the detection of particular pre-defined events.

In various embodiments, at 233, the principals identified in the community list are also associated with other metadata, such as public key certificates. At 234, the public key certificates permit the principal service to encrypt communications occurring between specific principals using their corresponding public key certificates. Moreover, if a public key certificate changes based on a particular one of the principals the changed and new public key certificate can be dynamically detected and pushed from the identity service to the principal service.

In a like manner, a particular principal that is interacting with the principal service can have the identity service communicate any new public key certificate to members of its community list, in advance of interacting with those members. Of course in this case the trust specification will be heavily dependent upon the contract used to authenticate the principal, because this will affect the community lists that are including or excluding the principal. Alternatively, if a particular principal's public key certificate is not communicated before communications are made with needing members of the community list, then those members can contact the identity service, whereupon the identity service provides the needed public key certificate to those members, or alternatively, the identity service requests that the particular principal deliver the public key certificate to the identity service for delivery to those members. A variety of interactions and different scenarios can be used in which public key certificates are managed, dynamically generated, modified, and properly communicated between the particular principal interfacing with the principal service and the members of the community list, some of these interactions may involve using the identity service as a trusted intermediary.

At 235, the principal service can subdivide the community lists, establish subdivided trust specifications, and manage each subdivided list and its corresponding subdivided trust specifications with interactions occurring between the particular principal associated with the principal service and the principals associated with the subdivided community lists. In other words, the principal service is free to establish and manage its own trusted overlaid networks which are created and modified by the principal service based on the originally acquired community list and originally acquired trust specifications.

The embodiments of FIG. 2 demonstrate a principal service that interacts with a particular principal for purposes of acquiring, managing, and modifying community lists in order to create trusted overlaid trusted networks and manage interactions and relationships occurring within those overlaid trusted networks.

Figure 3:
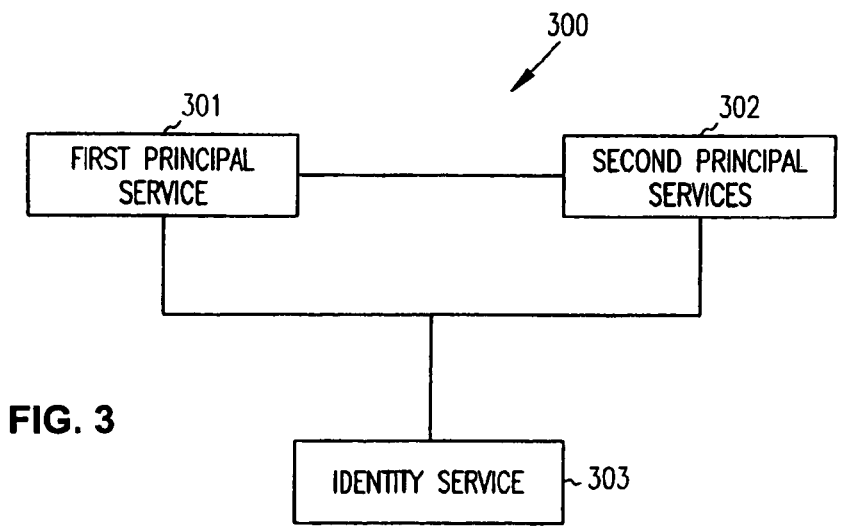
FIG. 3 is a diagram of a trusted relationship management system.

FIG. 3 is a diagram of a trusted relationship management system 300. The trusted relationship management system 300 is implemented in a computer readable and accessible medium. In one embodiment, some portions of the trusted relationship management system 300 implement the techniques described above with respect to method 100 and FIG. 1 (identity service interactions) and other portions of the trusted relationship management system 300 implement the techniques described above with respect to method 200 and FIG. 2 (principal service interactions). The trusted relationship management system 300 is accessible over a network.

The trusted relationship management system 300 includes a first principal service 301, a plurality of second principal services 302, and an identity service 303. Each of the principal services 301 and 302 perform processing similar to what has been discussed above with respect to the method 200 of FIG. 2. Moreover, the identity service 303 interacts with each of the principal services 301 and 302 using processing similar to what has been discussed above with respect to the method 300 of FIG. 3.

During operation of the trusted relationship management system 300, the first principal service 301 makes a request (pull) for or receives without making a request (push) a community list associated with a first principal that is interacting with the first principal service 301. The community list includes a plurality of second principal identifiers associated with second principals that interact with the first principal service 301 and the identity service 303 through second principal services 302. The second principal identifiers are also associated with metadata, that metadata can include conditions or requirements associated with permitting or not permitting a number of the second principals to enter into trusted relationships with the first principal. Additionally, in some embodiments, the metadata includes public key certificates associated with the second principals. The public key certificates are used during secure communications and identity establishment between the first principal and the second principals.

Additionally, the community list is associated with an initially provided trust specification, which is generated, assembled, and sent by the identity service 303 to the first principal service 301. The trust specification indicates policies and access rights associated with communications and interactions which can occur between the first principal and the second principals. Furthermore, the trust specification sets threshold limitations which cannot be exceeded by operations of the first principal service 301. That is, the trust specification sets boundaries for modifications which the first principal service 301 can make on the policies and the access rights associated with the second principals.

In some embodiments, the identity service 303 can detect when changes occur with a master version of community list of the first principal, the master version of the community list is maintained by the identity service 303 as part of its trust configuration. When changes are detected, the identity service 303 can automatically notify the first principal service 301 or wait until the principal service 301 issues a refresh request for an updated community list. Changes can be associated with entries of the second principals in the community list or associated with metadata in the community lists for particular second principals.

In one embodiment the identity service 303 can also be used as an intermediary between the first principal service 301 and a select one of the second principal services 302. This can be useful when the first principal dynamically generates a new public-private key pair, such as when the first principal service 301 establishes a session with the identity service 303 via a new physical processing device or new SP, such that a previous public-private key pair is no longer usable for the first principal service's 301 present session. Here, the community list provides the first principal service 301 the needed metadata having needed public key certificates for second principals, but the second principals will not have a newly and dynamically generated public key of the first principal.

In these situations, as was discussed above, the identity service 303 can securely sign the dynamically generated public key of the first principal and push it to the needing second principals via the second principal services 302, since it is signed by the identity service 303, the second principal services 302 can trust it and use it to replace metadata of their community lists. Alternatively, the identity service 303 can wait for a request from a needing second principal service 302 indicating that metadata (e.g., public key certificate) of the first principal appears to be out-of-date, since it cannot decrypt a message received from a first principal service 301. In this case, the identity service 303 is either already updated with the new public key certificate of the first principal or queries the first principal service 301 for the new public key certificate.

The first principal service 301 and the second principal services 302 are free to subdivide and manage their own individual community lists and associated trust specifications. These modifications represent individual overlay networks which the principal services 301 and 302 manage as custom defined trusted networks having custom defined policies and access rights associated with the principals of those networks. Additionally, a single principal identified in a custom list can be a group associated with multiple different principals or can be another embedded custom list.

In some cases, the principal services 301 and 302 may want some locally occurring changes to their respective locally managed community lists to be made permanent or semi-permanent (e.g., permanent until some event occurs). Assuming, such changes are permitted by contracts or global policies of the requesting principals, the identity service 303 will make the changes in the manners requested.

Another mode of operation is when the first principal service 301 wants a local policy set up so that specific changes are made each time the community list is modified, changed, or synchronized (from the identity service 303), if such a local policy is permitted by the global policy of contract. For example, never include the principal Steve, in the principal Lloyd's overlay network of principals identified by the group name friends. Thus, each time a synchronization operation puts Steve in Lloyd's friend group; the local policy removes it or prevents it from taking hold locally in the community list.

The trusted relationship management system 300 permits principals to use principal services 302 and 303 to interact with an identity service 303 for purposes of acquiring and locally managing community lists and trust specifications. In some cases, the identity service 303 can dynamically act as an intermediary to facilitate some relationships or make some synchronization to community lists as needed or desired.

Figure 4:
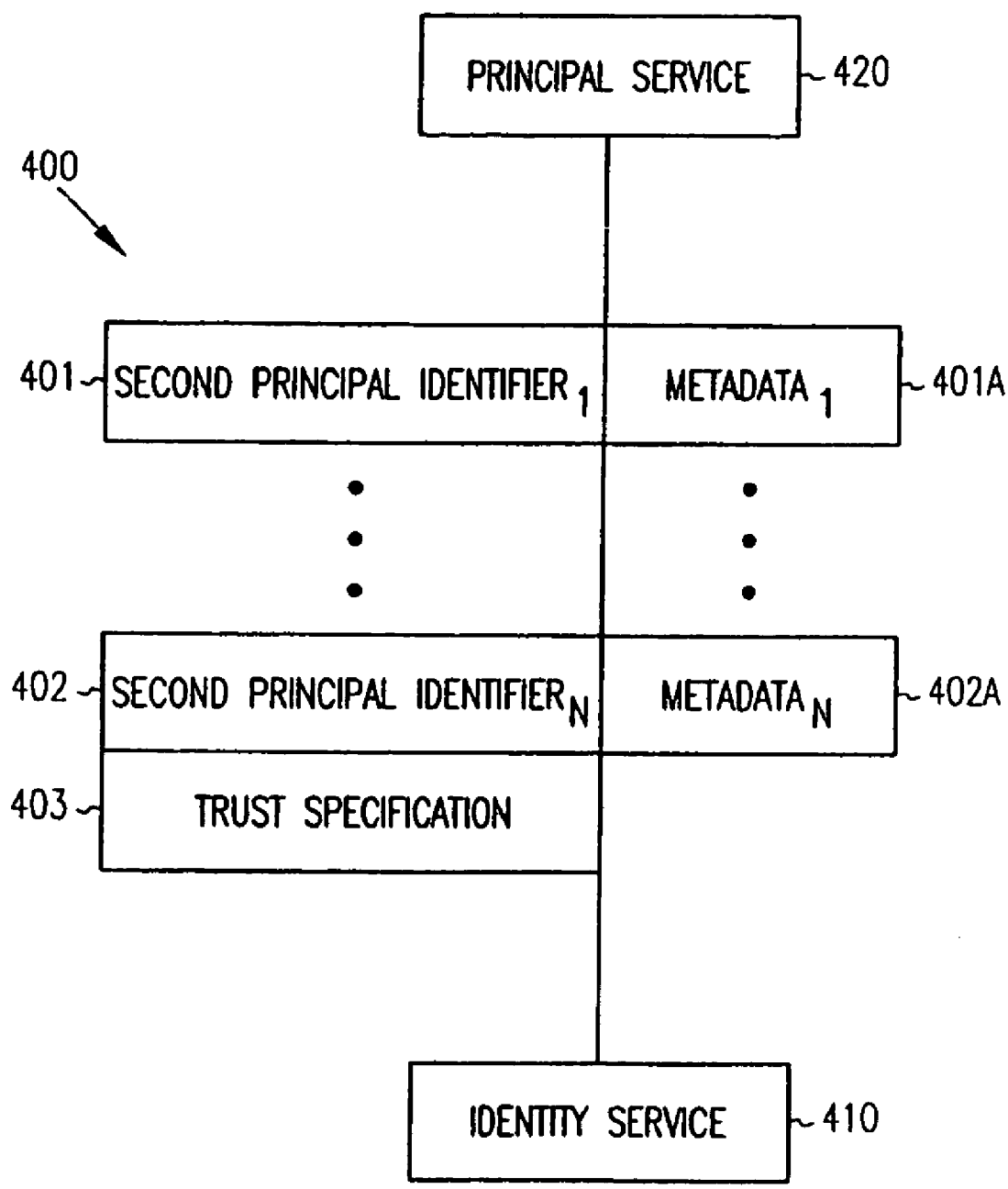
FIG. 4 is a diagram representing a trusted relationship data structure.

FIG. 4 is a trusted relationship data structure 400. The trusted relationship data structure 400 is implemented in a computer readable medium. The trusted relationship data structure 400 is consumed and transmitted over a network. In one embodiment, the trusted relationship data structure 400 is the community list described and manipulated above by the methods 100 and 200, and the system 300 of FIGS. 1, 2, and 3, respectively. The trusted relationship data structure 400 need not reside contiguously in memory or storage. That is, the trusted relationship data structure 400 can be logically, physically, or virtually assembled from a variety of memory or storage locations. In some embodiments, instances of the trusted relationship data structure 400 can be housed in data stores and managed globally by an identity service and housed in other data stores and managed locally by principal services. The trusted relationship data structure 400 can be any type of data structure, such as a list, a table, a tree, an index, a data store record, a custom-defined object, etc.

The trusted relationship data structure 400 includes a plurality of second principal identifiers 401 and 402, metadata 401A and 402A, and a trust specification 403. The second principal identifiers 401 and 402 uniquely identify second principals with which a first principal may or may not enter into a trusted relationship with. The trusted relationship data structure 400 is assembled, acquired, and associated with the first principal by an identity service 410 and sent to a principal service 420 of the first principal.

The metadata 401A and 402A includes public key certificates for a number of the second principals identified by the second principal identifiers 401 and 402. Additionally, the metadata 401A and 402A may include data that indicates conditions under which certain ones of the second principals can become trusted with the first principal or can become not trusted by the first principal.

The trust specification 403 is initially generated by the identity service 410 and provided with instances of the trusted relationship data structure 400. In some cases, the trust specification 403 is separate and distinct from the trusted relationship data structure 400. In other cases, the trust specification 403 is represented as a pointer within the trusted relationship data structure 400 and permits the principal service 420 to acquire the actual trust specification data from the identity service 410.

Once a populated instance of the trusted relationship data structure 400 is acquired by a first principal via the principal service 420 from the identity service 410, the first principal uses the first principal service 410 to subdivide, modify, and manage the instance of the trusted relationship data structure 400 in a local environment of the principal. In one embodiment, the identity service 410 transmits the initial instance of the trusted relationship data structure 400 as encrypted data, which is digitally singed by the identity service 410.

The first principal can interact with the principal service 420 to generate and manage trusted overlay networks associated with groups of principals with which the first principal interacts. The policies and access rights associated with these overlay networks are dynamically defined, modified, and managed by the first principal via the principal service 420. In some cases, changes can be made a permanent or semi-permanent part of a trust configuration associated with the first principal. In these instances, the changes are communicated to the identity service 410, where contracts and global policies associated with the first principal are evaluated to ensure the changes are permissible, and if they are permissible, the identity service 410 updates the appropriate trust or identity stores with the changes.

In some embodiments, the identity service 410 can inspect and monitor a global trust configuration for the first principal and dynamically send any changes that affect one or more of the entries of an instance of the trusted relationship data structure 400 to the first principal via the principal service 420. In other cases, the identity service 410 can periodically at configurable periods check for changes and notify the principal service 420 if changes are detected. In yet other situations, the identity service 410 only checks for changes when the principal service 420 makes a refresh request 420 to the identity service 410.

In some embodiments, the identity service 410 can act as an intermediary between principal services 420 when changes are detected and needed. The changes can be communicated between different instances of the trusted relationship data structure 400, such as when dynamic public key certificates need to be communicated for trusted relationships to proceed properly.

Although specific embodiments have been illustrated and described herein, those of ordinary skill in the art will appreciate that any arrangement calculated to achieve the same purpose can be substituted for the specific embodiments shown. This disclosure is intended to cover all adaptations or variations of various embodiments of the invention. It is to be understood that the above description has been made in an illustrative fashion only. Combinations of the above embodiments, and other embodiments not specifically described herein will be apparent to one of ordinary skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

It is emphasized that the Abstract is provided to comply with 37 C.F.R. §1.72(b), which requires an Abstract that will allow the reader to quickly ascertain the nature and gist of the technical disclosure. It is submitted with the understanding that it will not be used to interpret or limit the scope or meaning of the claims.

In the foregoing Detailed Description, various features are grouped together in single embodiments for the purpose of description. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. The following claims are hereby incorporated into the Detailed Description, with each claim standing on its own as a separate preferred embodiment.

What is claimed is:

1. A method for dynamically establishing trust relationships, comprising:

acquiring a community list for a requesting principal via an identity service, wherein the community list includes one or more different principals with which the requesting principal can permissibly establish a trust relationship and wherein the community list identifies other principals that the requesting principal may not engage in other trusted relationships with and the community list also includes conditions for particular ones of the one or more different principals that are to be satisfied before the trust relationship with those particular ones are permitted to proceed;

dynamically maintaining the community list separate from the principal via the identity service in a trust configuration associated with the requesting principal, and wherein the trust configuration includes a threshold limitations which cannot be exceeded by the requesting principal, and wherein hard limitations with respect to communications with the one or more different principals and which are defined in the trust configuration cannot be expanded by the requesting principal but the requesting principal can add more restrictive limitations to a version of the trust configuration being maintained by the requesting principal; and transmitting the community list and a copy of the trust configuration to the requesting principal, and wherein the identity service is an intermediary between the requesting principal and one of the one or more different principals.

2. The method of claim 1 further comprising:
detecting changes to the community list;
updating the trust configuration with the changes; and
notifying the requesting principal of the changes.

3. The method of claim 1 further comprising:
receiving a refresh request from the requesting principal;
determining if there are changes to the community list;
updating the trust configuration with the changes, if present; and
notifying the requesting principal of the changes, if present.

4. The method of claim 1 further comprising associating a time-to-live constraint with the transmitted community list, wherein the time-to-live constraint informs the requesting principal when it is recommended that a refreshed version of the community list be requested.

5. The method of claim 1 further comprising:
removing a selective one of the one or more different principals from the community list producing a modified community list upon notice from the requesting principal; and
updating the trust configuration with the modified community list.

6. The method of claim 1 further comprising:
receiving an add request from the requesting principal to add a new principal to the community list;
verifying a contract and policy associated with the requesting principal permits the new principal to be added in the community list;
producing a modified community list with the new principal added to the community list, if verified; and
updating the trust configuration with the modified community list, if verified.

7. The method of claim 6 further comprising:
determining the add request is a permanent request from the requesting principal; and
updating one or more stores with the new principal, wherein the one or more stores were used to derive the trust configuration.

8. The method of claim 1 further comprising:
detecting an event that revokes the requesting principal's use of the community list;
removing the trust configuration; and
revoking the community list from the requesting principal.

9. A method for dynamically managing trust relationships, comprising:

receiving a community list from an identity service, wherein the community list includes one or more principals with which trusted relationships can be established, and wherein the community list identifies specific principals that a requesting principal may not engage in other trusted relationships with and the community list also includes conditions for particular ones of the one or more different principals that are to be satisfied before the trust relationship with those particular ones are permitted to proceed with the requesting principal;

acquiring one or more trust specifications for the community list from the identity service, and wherein the trust specifications includes threshold limitations which cannot be exceeded by the one or more principals, and wherein hard limitations with respect to communications among the principals and which are defined in the trust specifications cannot be expanded by the principals but any given requesting principal can add more restrictive limitations to a particular trust specification being maintained by that requesting principal; and dynamically managing interactions with the one or more principals according to the one or more trust specifications, and wherein the identity service is an intermediary between the requesting principal and one of the one or more different principals.

10. The method of claim 9 further comprising removing a selective one of the principals from the community list.

11. The method of claim 9 further comprising:
requesting from the identity service the addition of a new principal to the community list; and
adding the new principal if the identity service permits.

12. The method of claim 9 further comprising:
acquiring public key certificates from metadata of the community list for selective ones of the principals; and
performing at least one of encrypting and signing communications occurring during the interactions with the selective ones of the principals with the acquired public key certificates.

13. The method of claim 9 further comprising:
dividing the community list into one or more sub-community lists;
establishing sub-trust specifications for each of the sub-community lists; and
managing the interactions with the one or more principals according to appropriate ones of the sub-trust specifications.

14. The method of claim 13 wherein the receiving further includes receiving the community list where at least one of the principals in the community list is a group having multiple entries and each entry associated with an additional principal.

15. The method of claim 13 wherein the wherein the receiving further includes receiving the community list where at least one of the principals in the community list is a separate community list.

16. A trusted relationship management system, comprising:
a first principal service;
a plurality of second principal services; and
an identity service, which is an intermediary between the first principal service and the plurality of second principal services, wherein the first principal service receives a community list from the identity service that identifies a plurality of second principals with which a first principal can establish trusted relationships via the first principal service, which interacts with each of the second principal services, and wherein interactions occurring between the first principal and the second principals are defined by an initial trust specification assembled by the identity service and initially delivered to the first principal service as a version of that trust specification and that version includes a threshold limitations which cannot be exceeded by the first principal, and wherein hard limitations with respect to communications with the second principals and which are defined in the version of the trust specification cannot be expanded by the first principal but the first principal can add more restrictive limitations to the version being maintained by the first principal.

17. The trusted relationship management system of claim 16 wherein the identity service associates a public key certificate with at least one of the second principals identified in the community list.

18. The trusted relationship management system of claim 16 wherein the identity service dynamically notifies the first principal service when a change is detected with entries or with metadata associated with the community list.

19. The trusted relationship management system of claim 16 wherein the identity service accepts a dynamically generated public key certificate from the first principal service associated with a dynamically generated public-private key pair for the first principal and provides the dynamically generated public key certificate to select ones of the second principal services.

20. The trusted relationship management system of claim 16 wherein the first principal service uses a public key certificate and the associated private key, encrypts the certificate with the public key of the third principal from the third principal's well-known certificate, and sends it to the identity service, the identity service sends it to the third-principal, the third-principal validates the identity service is trusted, uses the private key associated with the well-known certificate of the third principal to decrypt the encrypted certificate, obtains a strongly rooted public-private key pair of the first principal service and encrypts it with the public key of the first principal service based on contents of the decrypted certificate, and sends the encrypted strongly rooted public-private key pair to the identity service, the identity service forwards that to the first principal service, the first principal service decrypts the encrypted strongly rooted public-private key pair with the private key associated with the certificate used in the third principal transaction and uses the decrypted strongly rooted key pair to communicate with one or more of the second principals services.

21. The trusted relationship management system of claim 20 wherein as information is passed between at least one of the first principal service and the identity service and the identity service and the third principal, that information is signed by a sending party and verified by a receiving party.

22. The trusted relationship management system of claim 16 wherein the identity service adds a new second principal to the community list on the request of the first principal service and after validating that a contract or a policy of the first principal permits the new second principal to be added.

23. The trusted relationship management system of claim 16 wherein the identity service provides an original trust specification with the community list to the first principal service and wherein the first principal service manages the original trust specification and makes one or more changes to the original trust specification, wherein the one or more changes are more limiting than the original trust specification.

24. The trusted relationship management system of claim 16 wherein the first principal service sub-divides the community list into one or more sub-community lists, wherein each sub-community list represents an overlay network which the first principal can interact within and which the first principal service can dynamically manage.

* * * * *

UNITED STATES PATENT AND TRADEMARK OFFICE
CERTIFICATE OF CORRECTION

| | | |
|---|---|---|
| PATENT NO. | : 7,316,027 B2 | Page 1 of 1 |
| APPLICATION NO. | : 10/770677 | |
| DATED | : January 1, 2008 | |
| INVENTOR(S) | : Burch et al. | |

It is certified that error appears in the above-identified patent and that said Letters Patent is hereby corrected as shown below:

On the title page, in field (56), under "Other Publications" in column 2, line 1, delete "edetion," and insert -- edition, --, therefor.

In column 16, line 53, in Claim 15, after "wherein the" delete "wherein the".

In column 18, lines 14—15, in Claim 21, after "identity service" delete "and the identity service".

Signed and Sealed this

Fifteenth Day of July, 2008

JON W. DUDAS
*Director of the United States Patent and Trademark Office*